United States Patent
Hirschmann et al.

(10) Patent No.: US 6,890,606 B2
(45) Date of Patent: *May 10, 2005

(54) NEMATIC LIQUID-CRYSTAL COMPOSITION

(75) Inventors: Harald Hirschmann, Darmstadt (DE); Sven Schupfer, Aschaffenburg (DE); Marcus Reuter, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/269,868

(22) Filed: Oct. 15, 2002

(65) Prior Publication Data

US 2003/0136945 A1 Jul. 24, 2003

Related U.S. Application Data

(62) Division of application No. 09/624,401, filed on Jul. 24, 2000, now Pat. No. 6,497,828, which is a division of application No. 09/126,955, filed on Jul. 31, 1998, now Pat. No. 6,174,572.

(30) Foreign Application Priority Data

Aug. 1, 1997 (DE) .......................................... 197 33 199

(51) Int. Cl.[7] .................. C09K 19/30; C09K 19/12; C09K 19/34; C09K 19/20
(52) U.S. Cl. ............. 428/1.1; 252/299.63; 252/299.66; 252/299.61; 252/299.67
(58) Field of Search ............... 428/1.1; 252/299.63, 252/299.66, 299.61, 299.67

(56) References Cited

U.S. PATENT DOCUMENTS

| | | |
|---|---|---|
| 5,013,477 A | 5/1991 | Buchecker et al. |
| 5,102,578 A | 4/1992 | Buchecker et al. |
| 5,380,462 A | 1/1995 | Kelly et al. |
| 5,653,911 A | 8/1997 | Kondo et al. |
| 5,709,820 A | 1/1998 | Kato et al. |
| 5,720,899 A | 2/1998 | Kondo et al. |
| 5,776,367 A | 7/1998 | Matsui et al. |
| 5,904,876 A | 5/1999 | Ichinose et al. |
| 5,965,060 A | 10/1999 | Tarumi et al. |
| 5,976,404 A | 11/1999 | Hirschmann et al. |
| 5,985,171 A | 11/1999 | Rieger et al. |
| 5,993,692 A | 11/1999 | Tarumi et al. |
| 5,997,767 A | 12/1999 | Hirschmann et al. |
| 6,017,469 A * | 1/2000 | Reiffenrath et al. .... 252/299.63 |
| 6,027,665 A | 2/2000 | Pausch et al. |
| 6,028,655 A | 2/2000 | Weber et al. |
| 6,036,884 A | 3/2000 | Tarumi et al. |
| 6,045,878 A | 4/2000 | Tarumi et al. |
| 6,054,193 A | 4/2000 | Hirschmann et al. |
| 6,056,894 A | 5/2000 | Hirschmann et al. |
| 6,066,268 A | 5/2000 | Ichinose et al. |
| 6,126,857 A | 10/2000 | Reiffenrath et al. |
| 6,146,720 A | 11/2000 | Pausch et al. |
| 6,174,572 B1 | 1/2001 | Hirschmann et al. |
| 6,497,828 B1 * | 12/2002 | Hirschmann et al. .. 252/299.63 |

FOREIGN PATENT DOCUMENTS

WO    WO 95/30723    * 11/1995

* cited by examiner

*Primary Examiner*—Shean C. Wu
(74) *Attorney, Agent, or Firm*—Millen, White, Zelano & Branigan, P.C.

(57) ABSTRACT

The invention relates to nematic liquid-crystal compositions comprising bisalkenyl compounds of the formula I

I

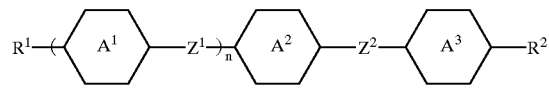

and to their use in plasma-addressed LCDs.

12 Claims, No Drawings

NEMATIC LIQUID-CRYSTAL COMPOSITION

BACKGROUND OF THE INVENTION

The invention relates to nematic liquid-crystal compositions based on bisalkenyl compounds and terminally fluorinated compounds. These compositions are particulary suitable for plasma-addressed display devices.

Plasma-addressed displays (PADs) are of great utility for high-information displays, which are of commercial interest. Such PADs are used in TV applications and in high-information displays for computer screens, automobiles and aircraft.

PADs have electrical switching elements and a plasma cell with a plurality of addressing channels which is connected to the display cell.

Such PADs are disclosed, for example, in WO 96/00925, EP 0 628 944, EP 0 545 569, U.S. Pat. No. 4,896,149 and U.S. Pat. No. 5,077,553.

In a PAD, the switching elements are addressed via a multiplexing scheme. This charges the electrodes of a pixel in the limited time during which they are active. They subsequently become and remain inactive until they are addressed again in the next cycle. Consequently, the voltage change at a plasma-addressed pixel is an unwanted, but very crucial characteristic of such a display. Discharge of the electrodes of the pixel is determined by two factors, the capacity of the pixel and the specific resistance of the liquid-crystal material, i.e., the liquid crystal, between the electrodes.

Conventional liquid-crystalline materials for active matrix displays (AMDs) are unsuitable for PADs since they have excessively high values for the dielectric anisotropy.

There therefore continues to be a great demand for liquid-crystal compositions having high specific resistance and having other material properties which are suitable for use in PADs, such as, for example, a broad nematic mesophase range with an extremely low smectic-nematic transition temperature and the absence of crystallization at low temperature.

A further requirement in such compositions is for high steepness of the characteristic lines (small difference between $V_{90}$ and $V_{10}$).

SUMMARY OF THE INVENTION

An object of the invention is to provide liquid-crystal compositions which have very high specific resistance and which also satisfy the other requirements.

An additional requirement is for compositions having low Δn values of <0.1 and rotational viscosities of ≦150 mpa·s at 20° C., preferably ≦120 mPa·s, in particular ≦100 mpa·s.

It has now been found that nematic liquid-crystal compositions for plasma addressed liquid crystal displays (PALCDS) comprising at least one compound of the formula I

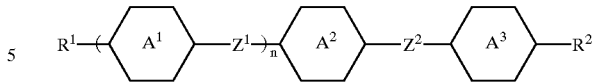

in which
$R^1$ and $R^2$, independently of one another, are alkenyl or alkenyloxy having 1 to 8 carbon atoms,
each $Z^1$ and $Z^2$, independently of one another, and if $Z^1$ is present a number of times, these radicals also independently of one another, are a single bond, —(CH$_2$)$_2$— —COO—, —OCO—, trans-CH=CH—, —CH$_2$O— or —OCH$_2$—, where $Z^2$ is preferably a single bond,
each $A^1$, $A^2$ and $A^3$, independently of one another, and if $A^1$ is present a number of times, these radicals also independently of one another, are trans-1,4-cyclohexylene, 1,4-cyclohexenylene, in which also one or two nonadjacent CH$_2$ groups may be replaced by oxygen, 1,4-phenylene, 2-fluoro-1,4-phenylene, 3-fluoro-1,4-phenylene, 2,3-difluoro-1,4-phenylene, 3,5-difluoro-1,4-phenylene, 2,6-difluoro-1,4-phenylene or 1,5-pyridyl or 1,5-pyrimidyl, in which one or two H atoms are optionally replaced by F, where at least one of the rings $A^2$ is preferably a trans-1,4-cyclohexylene rings, and particularly preferably both rings $A^2$ and $A^3$ are trans-1,4-cyclohexylene,
and
n is 0, 1 or 2,
are particularly suitable for PAD applications. $Z^2$ is preferably a single bond, and at least one of the rings $A^2$ and $A^3$ is preferably a trans-1,4-cyclohexylene ring. Particularly preferably, both rings $A^2$ and $A^3$ are trans-1,4-cyclohexylene. In PADs, very high values for the RC time (i.e., the time constant for the discharge of the pixel electrodes) can be achieved. These compositions likewise have reduced viscosity and enable AMDs to be operated at the first transmission minium, and exhibit no crystallization and no occurrence of smectic phases when stored in test cells of appropriate cell gap for times of at least 100 hours preferably 500 hours and most preferably 1000 hours at a temperature of –20° C., preferably at –30° C. and most preferably of –40° C.

Preference is furthermore given to liquid-crystal mixtures which comprise at least one compound of the formula II

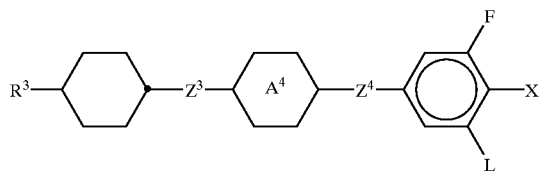

in which
$R^3$ is alkyl, alkenyl, alkyloxy or alkenyloxy having 1–8 carbon atoms,
$Z^3$ and $Z^4$, independently of one another, are a single bond, (CH$_2$)$_2$, OCH$_2$, CH$_2$O, COO, CN, F, CF$_2$H or CF$_3$
X is OCF$_2$H, OCF$_3$, OCH$_2$CF$_3$, OCHFCF$_3$, OCF$_2$CF$_2$H or F
L is H or F
and
$A^4$ is trans-1,4-cyclohexylene, 1,4-phenylene, 3-fluoro-1,4-phenylene or 3,5-difluoro-1,4-phenylene.

Particular preference is given to nematic liquid-crystal compositions which comprise at least one compound of the formula Ia

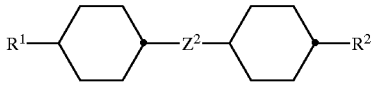
Ia in which
R¹ and R²₁ independently of one another, are alkenyl or alkenyloxy having 1 to 8 carbon atoms,
and
$Z^2$ is a single bond, —(CH₂)₂— or trans-CH=CH—.
$Z^2$ is particularly preferably a single bond.

Nematic liquid-crystal compositions of the present invention furthermore preferably comprise at least one compound of the formula III

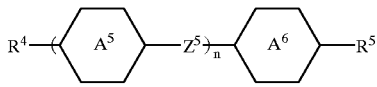
III in which
R⁴ and R⁵, independently of one another,
are alkyl, alkoxy, alkenyl or alkenyloxy having 1 to 10 carbon atoms, in which 1 or a maximum of 2 non-adjacent CH₂ groups may be replaced by O,
each $Z^5$ if it is present a number of times independently of one another, is a single bond, COO, OCO, (CH₂)₂, OCH₂, CH₂O or trans-CH=CH,
each A⁵ and A⁶ independently of one another, and if A⁵ is present a number of times these radicals also independently of one another,
are trans-1,4-cyclohexylene, 1,4-cyclohexenylene, in which also one or two nonadjacent CH₂ groups may be replaced by oxygen, 1,4-phenylene, 2-fluoro-1,4-phenylene, 3-fluoro-1,4-phenylene, 2,3-difluoro-1,4-phenylene, 3,5-difluoro-1,4-phenylene, 2,6-difluoro-1,4-phenylene or 1,5-pyrimidinedyl, in which one or two H atoms are optionally replaced by F,
and
n is 1, 2 or 3.

Very particular preference is given to nematic liquid-crystal compositions which comprise at least one compound of the formula Iaa

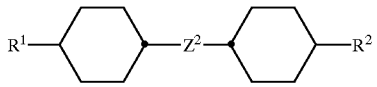
Iaa in which
R¹ and R², are each, independently of one another, CH=CH₂, CH=CH—CH₂—CH₃ and/or CH=CH—CH₃
and
$Z^2$ is (CH₂)₂ or a single bond.

$Z^2$ is preferably a single bond and R¹ and R² are preferably identical to each other.

Preference is furthermore given to nematic liquid-crystal compositions which, besides compounds of the formula Iaa, comprise at least one further compound of the formula I

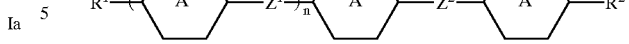
I and/or of the formula II

II

In a preferred embodiment, the compositions according to the invention comprise from 10 to 34% of two or more compounds of the formula I.

The nematic compositions particularly preferably comprise at least two compounds of the formula Iaa from the group consisting of the formulae Ia1 to Ia9:

Ia1

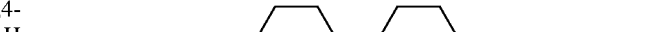
Ia2

Ia3

Ia4

Ia5

Ia6

Ia7

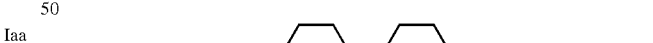
Ia8

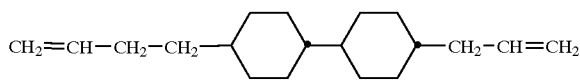

Ia9

The symmetrically substituted compounds of the formula Iaa, i.e., the compounds Ia1, Ia3, Ia5 and Ia8, are preferred, and of these, very particular preference is given to the 1-alkenyl compounds Ia1, Ia3 and Ia5. The best response times are achieved when using Ia1, Ia2 and Ia3. The most preferred compounds are those of the formulae Ia1 and Ia5.

The LC compositions according to the invention have a dielectric anisotropy, measured at 20° C. and 1 kHz, of less than 4.0, preferably between 1.0 and 3.0, in particular from 1.5 to 2.5. The LC compositions according to the instant invention have a birefringence at 20° C. and 589 nm of not more than 0.1, preferably not more than 0.08, especially preferred of not more than 0.075 and most preferred of below 0.07. The voltage holding ratio HR after 5 minutes at 100° C. and IV using a commercial equipment of Antronic-Melchers, Germany, is at least 98%, preferably higher than 98.5%, especially preferred higher than 99.0% and most preferred at least 99.5%. The clearing point of the compositions according to the invention is above 75° C., in particular above 80° C., very particularly above 90° C.

Compositions of this type preferably comprise two, three or four compounds of the formula I. Preferred compositions comprise at least of more than 10% by weight of the individual compounds of the formula I.

The compounds of the formula I are disclosed in the German patent applications and can be prepared analogously to known compounds.

The compounds of the formulae II and III are known to the person skilled in the art.

Preferred compositions likewise comprise two or more compounds of the formula III. Preference is given here to the compounds selected from the group consisting of the formulae IIIa and IIIb:

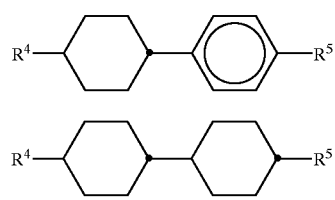

IIIa

IIIb in which $R^4$ and $R^5$ are as defined above under the formula III.

In a preferred embodiment, the compositions according to the invention comprise at least two compounds of the formula IIIa.

The compositions according to the invention preferably comprise from 6 to 48% by weight, in particular from 10 to 34% by weight or from 16 to 30% by weight, of components of the formula I. The percentages by weight for the other groups are preferably in the following ranges:
Formula II: from 10 to 45%, in particular from 18 to 38%
Formula III: from 5 to 52%, in particular from 12 to 40%.

The components of the formulae I, II and II preferably form the basis of the claimed compositions and together make up at least 60% by weight, particularly preferably at least 75% by weight, of the compositions However, it is also possible to use further LC components in smaller percentages in addition to the components of the formulae I to III for fine adjustment of the claimed compositions. In this case, compounds having a high clearing point are used in particular.

In general, the compositions consist of a plurality of compounds mixed in a conventional manner. In general, the desired amount of the components used in the smaller amount are dissolved in the components making up the principal constituent, advantageously at elevated temperature. If the temperature selected is above the clearing point of the principal constituent, completion of the dissolution process is particularly easy to observe.

However, it is also possible to mix the components in a suitable solvent, for example in acetone, chloroform or methanol, and, after mixing, to remove the solvent again, for example by distillation under reduced pressure. It goes without saying that it must be ensured here that the solvent does not introduce any impurities or undesired doping substances.

By means of suitable additives, the liquid-crystal phases according to the invention can be modified in such a way that they can be used in any type of PAD which has been disclosed hitherto.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application No. 197 33 199.8, filed Aug. 1, 1997 is hereby incorporated by reference.

In order to characterize the liquid-crystalline compounds used in the compositions according to the invention. The following abbreviations are used in the examples. The indices n and m denote the number of carbon atoms present in the terminal alkyl radicals.

The physical properties are the values at 20° C., unless explicitly stated otherwise.

In the present application and in the examples below, the structures of the liquid-crystal compounds are indicated by means of acronyms, the transformation into chemical formulae taking place in accordance with Table A and Table B below. All radicals $C_nH_{2n+1}$ and $C_mH_{2m+1}$ are straight-chain alkyl radicals having n or m carbon atoms respectively. The coding in Table B is self-evident. In Table A, only the acronym for the parent structure is given. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |

-continued

| Code for $R^1$, $R^2$, $L^1$, $L^2$ | $R^1$ | $R^2$ | $L^1$ | $L^2$ |
|---|---|---|---|---|
| nF.F | $C_nH_{2n+1}$ | F | H | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—$C_sH_{2s}$— | CN | H | H |
| nAm | $C_nH_{2n+1}$ | $COOC_mH_{2m+1}$ | H | H |
| nF.Cl | $C_nH_{2n+1}$ | Cl | H | F |

TABLE A

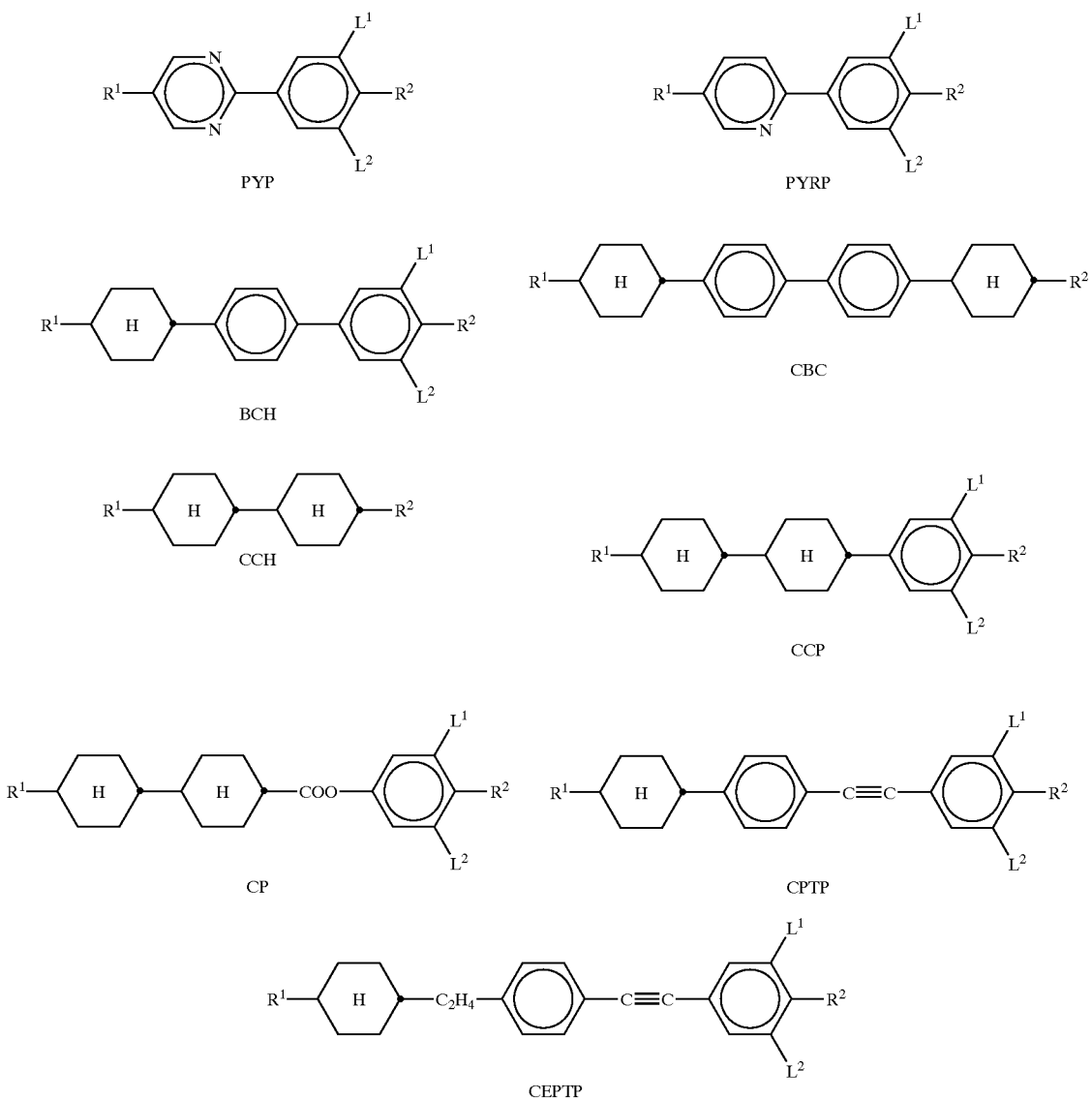

TABLE A-continued
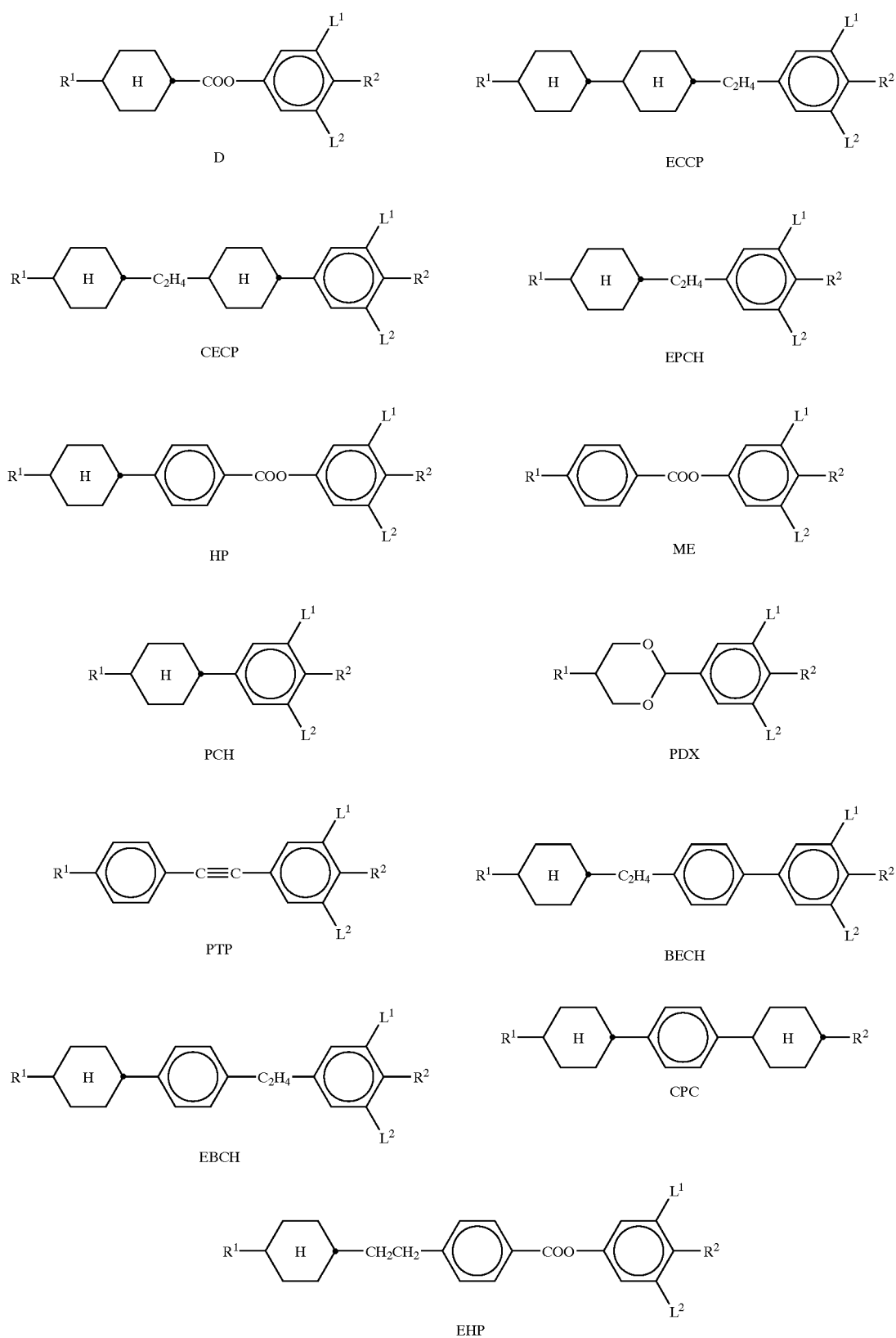

TABLE A-continued
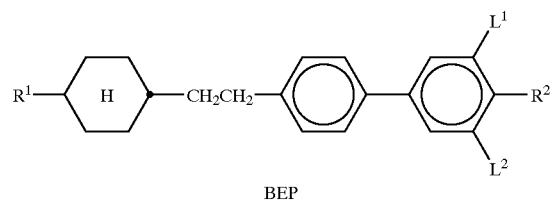
BEP
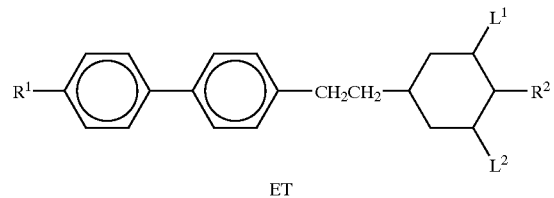
ET
TABLE B
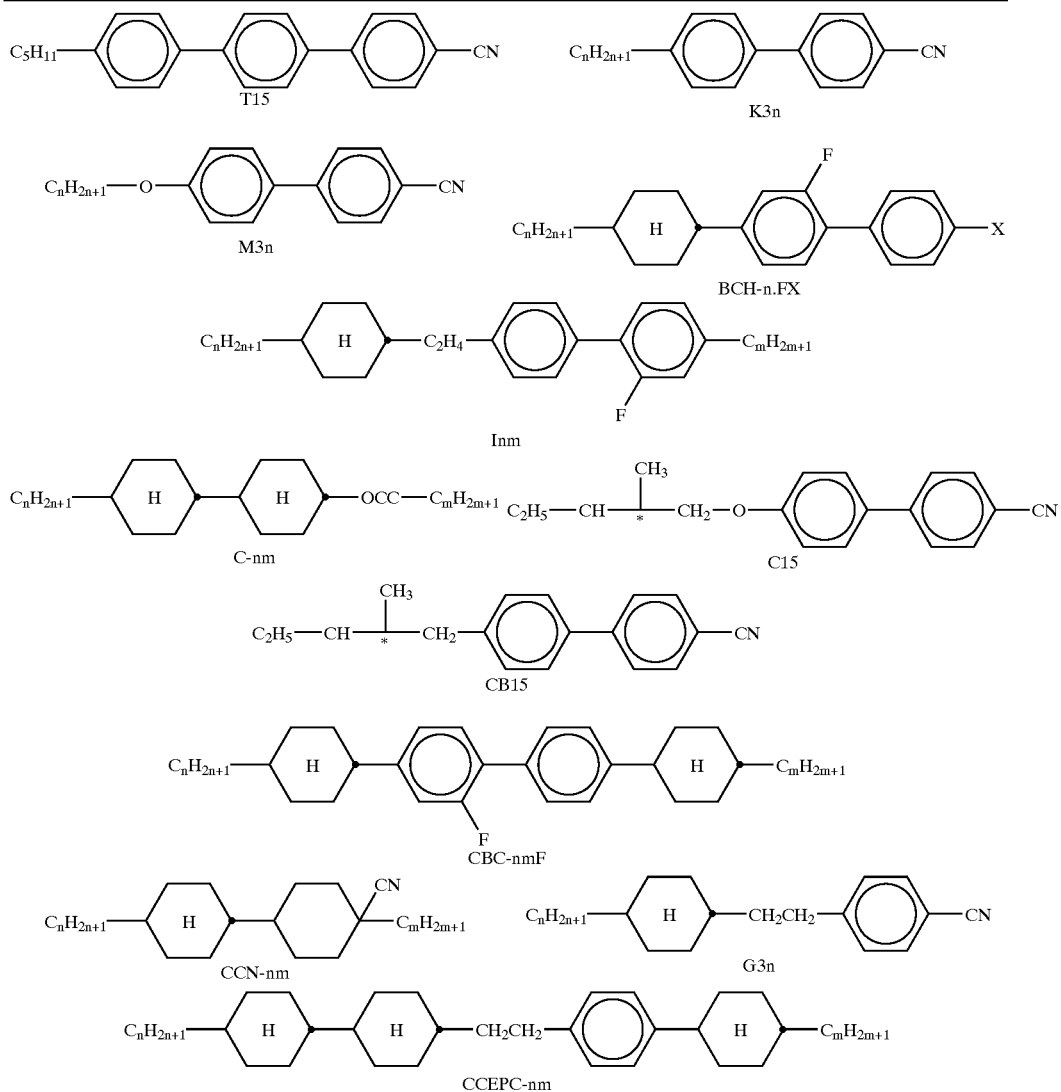

TABLE B-continued $C_nH_{2n+1}$—H—H—COO—⟨⟩—H—$C_mH_{2m+1}$
CCPC-nm $C_nH_{2n+1}$—H—H—COO—H—$C_mH_{2m+1}$
CH-nm $C_nH_{2n+1}$—H—⟨⟩—OOC—H—$C_mH_{2m+1}$
HD-nm $C_nH_{2n+1}$—H—⟨⟩—COO—H—$C_mH_{2m+1}$
HH-nm $C_nH_{2n+1}$—⟨⟩—⟨⟩—H(CN)($C_mH_{2m+1}$)
NCB-nm $C_nH_{2n+1}$—H—COO—H—$C_mH_{2m+1}$
OS-nm $C_2H_5$—H—COO—⟨⟩—⟨⟩—CN
CHE $C_nH_{2n+1}$—H—$C_2H_4$—⟨⟩—⟨⟩—H—$C_mH_{2m+1}$
ECBC-nm $C_nH_{2n+1}$—H—$C_2H_4$—H—$C_mH_{2m+1}$
ECCH-nm $C_nH_{2n+1}$—H—H—$CH_2O$—$C_mH_{2m+1}$
CCH-n1EM $C_nH_{2n+1}$—⟨⟩—⟨⟩(F)—⟨⟩—CN
T-nFN $C_nH_{2n+1}O$—⟨⟩—⟨⟩(F)—⟨⟩—CN
B-nO.FN $C_nH_{2n+1}$—H—CH=CH—H—H—$C_mH_{2m+1}$
CVCC-n-m $C_nH_{2n+1}$—H—CH=CH—H—⟨⟩—$C_mH_{2m+1}$
CVCP-n-m TABLE B-continued
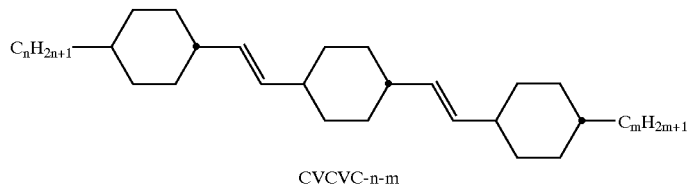
CVCVC-n-m
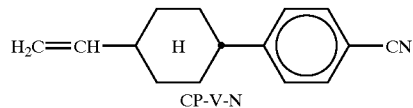
CP-V-N
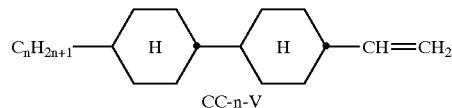
CC-n-V
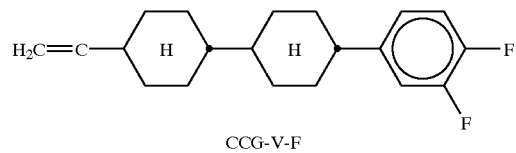
CCG-V-F
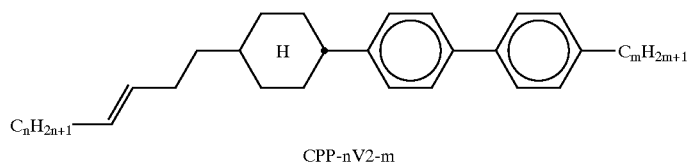
CPP-nV2-m
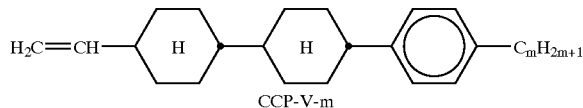
CCP-V-m
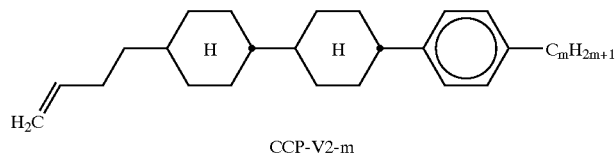
CCP-V2-m
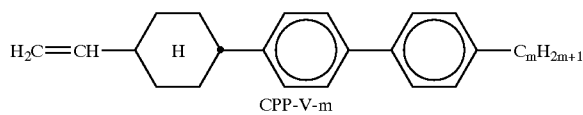
CPP-V-m
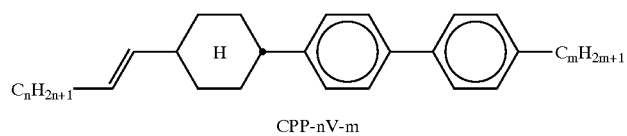
CPP-nV-m
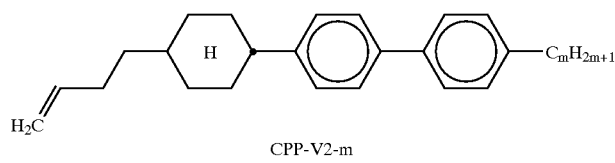
CPP-V2-m TABLE B-continued

CC-V-V

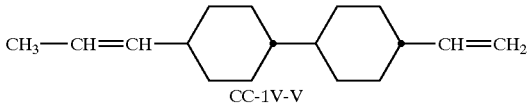
CC-1V-V

CC-1V-V1

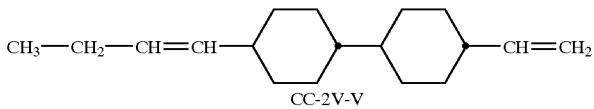
CC-2V-V

CC-2V-V2

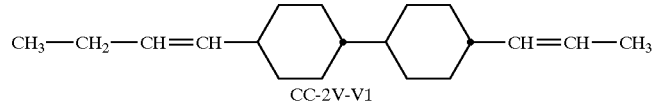
CC-2V-V1

CC-V1-V

CC-V1-1V

CC-V2-1V

Δn denotes the optical anisotropy (589 nm, 20° C.), Δe denotes the dielectric anisotropy (1 kHz, 20° C.), H.R. denotes the voltage holding ratio (at 100° C., after 5 minutes in the oven, 1 V), $V_{0,0,20}$ denotes the threshold voltage determined at 20° C.

EXAMPLE 1

A mixture of the following composition was prepared and investigated for usefulness in PALCDs.

| Abbreviation | % by weight |
|---|---|
| CC-V-V | 14.0 |
| CC-2V-V2 | 10.0 |
| ECCP-3F.F | 5.0 |
| ECCP-5F.F | 5.0 |
| CCP-2F.F.F | 6.0 |
| CCP-3F.F.F | 6.0 |
| CCP-5F.F.F | 6.0 |
| CCH-303 | 13.0 |
| CCH-501 | 13.0 |
| CP-33 | 5.0 |
| CP-43 | 5.0 |
| CCPC-33 | 6.0 |
| CCPC-34 | 6.0 |
| | 100.0 |

This composition has the following properties:

| | |
|---|---|
| T (S, N) | <−20° C. |
| T (N, I) | 97.0° C. |
| Rot. visc. $\gamma_1$ (20° C.) | 99 mPa · s |
| Δn (20°C., 589 nm) | 0.0672 |
| Δε (20° C., 1 kHz) | 1.9 |
| $\varepsilon_{\parallel}$ (20° C., 1 kHz) | 5.0 |
| $K_1$ (20° C.) | 13.2 $10^{-12}$ N |

-continued

| | |
|---|---|
| $K_3/K_1$ (20° C.) | 1.04 |
| $V_{0,0,20}$ | 2.82 V |
| HR (100° C., 5 min, 1 V) | 99.6% |

The threshold voltage $V_{0,0,20}$ was determined at 20° C. (from dielectric measurements).

The voltage holding ratio (HR) was determined using an Autronic-Melchers measurement instrument as described in the Merck Group Liquid Crystal Newsletter No. 9, October 1992, by T. Jacob and U. Finkenzeller.

COMPARATIVE EXAMPLE 1

The liquid-crystal mixture having a similar clearing point was prepared analogously to Example 1, but without using any compounds of the formula I.

| Composition | |
|---|---|
| Abbreviation | % by weight |
| PCH-301 | 7.0 |
| PCH-302 | 3.0 |
| ECCP-3F.F | 5.0 |
| ECCP-5F.F | 5.0 |
| CCP-2F.F.F | 6.0 |
| CCP-3F.F.F | 6.0 |
| CCP-5F.F.F | 6.0 |
| CCH-301 | 14.0 |
| CCH-303 | 13.0 |
| CCH-501 | 13.0 |
| CP-33 | 5.0 |
| CP-43 | 5.0 |
| CCPC-33 | 4.0 |
| GCPC-34 | 4.0 |
| CCPC-35 | 4.0 |
| | 100.0 |
| Properties | |
| T (S, N) | <−20° C. |
| T (N, I) | 93° C. |
| Rot. visc. $\gamma_1$ (20° C.) | 122 mPa · s |
| Δn (20° C., 589 nm) | 0.0668 |
| Δε (20° C., 1 kHz) | 1.9 |
| $\varepsilon_{\parallel}$ (20° C., 1 kHz) | 5.2 |
| $K_1$ (20° C.) | $14.7 \cdot 10^{-12}$ N |
| $K_3/K_1$ (20° C.) | 1.12 |
| $V_{0,0,20}$ | 2.93 V |
| HR (100° C., 1 V) | 97.1% |

Compared with Comparative Example 1, Example 1 according to the invention, with a higher clearing points, is characterized by a significantly better threshold voltage and in particular by a considerably better rotational viscosity. The mixture according to the invention thus switches significantly more quickly. In addition, its HR is significantly higher, i.e. better for plasma addressing.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nematic liquid crystalline composition comprising at least one compound of the formula Ia

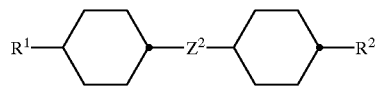

in which $R^1$ and $R^2$, are each independently alkenyl having 2 to 8 carbon atoms, and $Z^2$ is a single bond, or —(CH$_2$)$_2$—.

2. A composition according to claim 1, further comprising at least one additional compound of the formula I'

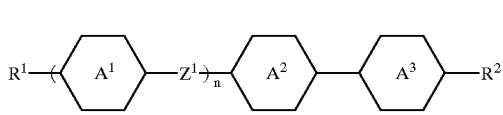

in which $R^1$ and $R^2$, are each independently, alkenyl having 2 to 8 carbon atoms, $Z^1$, is a single bond, —(CH$_2$)$_2$— —COO—, —COO—, trans-CH=CH—, —CH$_2$O— or —OCH$_2$—, $A^1$, $A^2$ and $A^3$ are, each independently, trans-1,4-cyclohexylene, 1,4-cyclohexenylene, in which one or two nonadjacent CH$_2$ group are optionally replaced by oxygen 1,4-phenylene, 2-fluoro-1,4-phenylene, 3-fluoro-1,4-phenylene, 2,3-difluoro-1,4-phenylene, 3,5-difluoro-1,4-phenylene, 2,6-difluoro-1,4-phenylene, 1,5-pyridyl or 1,5-pyrimidyl, in which one or two H atoms are optionally replaced by F, and n is 0, 1 or 2.

3. A composition according to claim 1, comprising at least two compounds of formulae Ia1 to Ia9

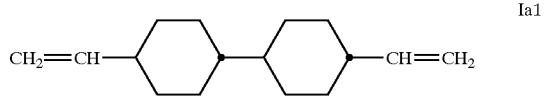

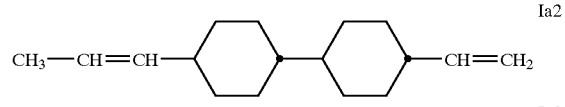

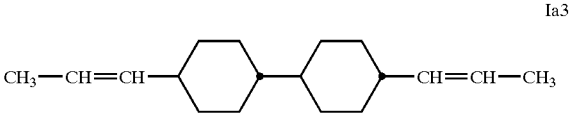

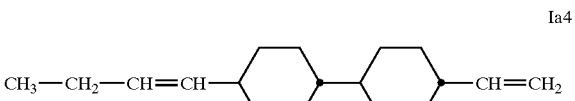

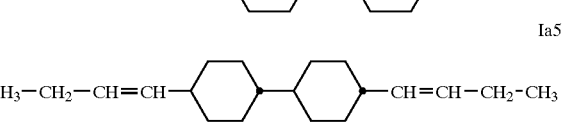

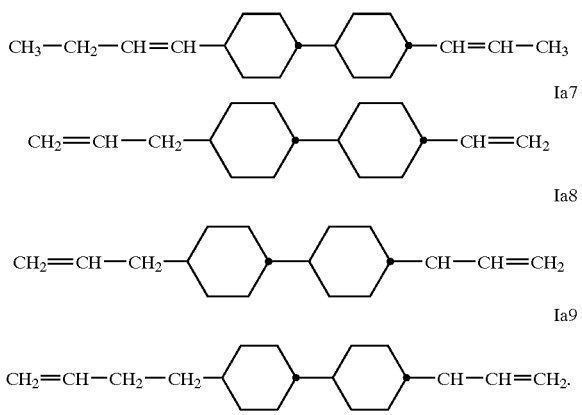

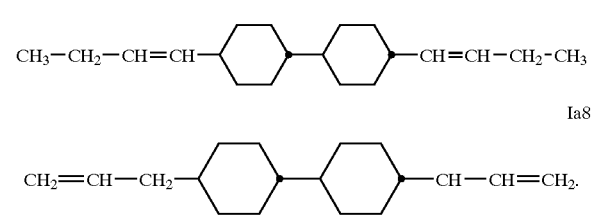

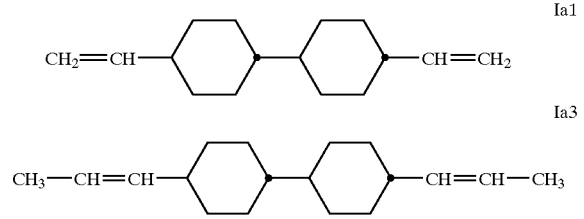

4. A composition according to claim 1, having a dielectric anisotropy, measured at 20° C. and 1 kHz of 1.0 to 3.0.

5. A composition according to claim 1, wherein $Z^2$ is a single bond.

6. A composition according to claim 4, comprising at least two compounds of formula Ia1, Ia3, Ia5 or Ia8

7. A plasma-addressed liquid crystalline display, comprising a nematic liquid-crystalline composition according to claim 6.

8. A plasma-addressed liquid crystalline display, comprising a nematic liquid-crystalline composition according to claim 1.

9. A plasma-addressed liquid crystalline display, comprising a nematic liquid-crystalline composition according to claim 2.

10. A plasma-addressed liquid crystalline display, comprising a nematic liquid-crystalline composition according to claim 3.

11. A plasma-addressed liquid crystalline display, comprising a nematic liquid-crystalline composition according to claim 4.

12. A plasma-addressed liquid crystalline display, comprising a nematic liquid-crystalline composition according to claim 5.

* * * * *

UNITED STATES PATENT AND TRADEMARK OFFICE
CERTIFICATE OF CORRECTION

PATENT NO. : 6,890,606 B2
APPLICATION NO. : 10/269868
DATED : May 10, 2005
INVENTOR(S) : Harald Hirschmann et al.

Page 1 of 1

It is certified that error appears in the above-identified patent and that said Letters Patent is hereby corrected as shown below:

Column 19,
Line 31, "$Z^1$, is a single bond, —(CH$_2$)$_2$— —COO—, —COO—," should read -- $Z^1$ is a single bond, —(CH$_2$)$_2$—, —COO—, —OCO—, --.
Line 35, "group" should read -- groups --.
Line 36, "oxygen" should read -- oxygen, --.

Column 21,

Lines 11-14, "  " should read

-- 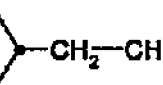 --.

Column 22,

Lines 8-11, " 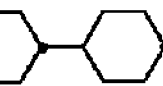 " should read

-- 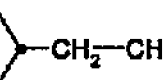 --.

Signed and Sealed this

Tenth Day of April, 2007

JON W. DUDAS
*Director of the United States Patent and Trademark Office*